United States Patent [19]

Irvin

[11] 4,301,529
[45] Nov. 17, 1981

[54] DRIVE CONTROL MECHANISM FOR A PHONOGRAPH

[75] Inventor: Ronald D. Irvin, Poway, Calif.
[73] Assignee: The Quaker Oats Company, Chicago, Ill.
[21] Appl. No.: 113,230
[22] Filed: Jan. 18, 1980
[51] Int. Cl.³ .............................................. G11B 15/44
[52] U.S. Cl. .................................................... 369/267
[58] Field of Search ................. 74/190, 200; 274/9 A; 369/267

[56] References Cited

U.S. PATENT DOCUMENTS

| | | | |
|---|---|---|---|
| 2,438,265 | 3/1948 | Metzner | 274/9 A |
| 2,551,266 | 5/1951 | Hartman | 274/9 A |
| 2,941,809 | 6/1960 | Schneider | 274/9 A |
| 3,869,129 | 3/1975 | Tateishi | 274/9 A |

FOREIGN PATENT DOCUMENTS

| | | | |
|---|---|---|---|
| 647503 | 8/1962 | Canada | 274/9 A |
| 1099605 | 9/1955 | France | 274/9 A |
| 517087 | 2/1955 | Italy | 274/9 A |
| 294750 | 2/1954 | Switzerland | 274/9 A |

Primary Examiner—John W. Shepperd
Attorney, Agent, or Firm—Cumpston & Shaw

[57] ABSTRACT

The object of this invention is to provide an improved drive control mechanism for the turntable of a phonograph.

The drive control mechanism comprises a control lever successively movable in one direction from an off position to a 33⅓ rpm (revolutions per minute) position or a 45 rpm position for record playing, and then in the reverse direction to its off position. A drive shaft has first and second drive portions of different diameter. A rotatable puck is interposed between the drive portions and turntable for selectively drivingly connecting the drive portions to the turntable. A linkage-means couples the control lever to the puck so that when the lever is moved between the off, 33⅓ rpm and 45 rpm positions, the puck is selectively moved (1) out of engagement with the drive portions and turntable, (2) into engagement with the first drive portion and turntable, and (3) into engagement with the second drive portion and turntable respectively.

3 Claims, 5 Drawing Figures

DRIVE CONTROL MECHANISM FOR A PHONOGRAPH

BACKGROUND OF THE INVENTION

1. Field of the Invention

This invention relates to phonographs, and particularly to an improved drive control mechanism for the turntable of a phonograph.

It is desirable in phonographs to provide an improved drive control mechanism having an off position in which the drive motor is turned off and a driven puck is disengaged from the drive shaft and turntable, a 33⅓ rpm (revolutions per minute) position in which the puck engages one part of the drive shaft and the turntable for driving same at 33⅓ rpm, and a 45 rpm position in which the puck engages a different part of the drive shaft and the turntable for driving same at 45 rpm. This is achieved by a drive shaft having drive portions of different diameter, a rotatable puck interposed between the drive portions and turntable for drivingly coupling and uncoupling them, and linkage means for coupling the puck to a control lever which is movable between the off, 33⅓ rpm and 45 rpm positions.

2. Description of the Prior Art

Drive control mechanisms for the turntable of a phonograph are known. However, such drive control mechanisms normally have a rotatable puck in constant driving engagement with the turntable whether the drive motor is turned on or off. When the drive motor is turned on, the turntable is driven at a selected speed. A problem with this type of drive control mechanism is that the puck, being in substantially constant pressure engagement with the drive shaft in the off position, develops a flattened surface portion which interferes with driving the turntable at a constant rotational velocity.

SUMMARY OF THE INVENTION

In accordance with the present invention, an improved drive control mechanism for the turntable of a phonograph is disclosed. The drive control mechanism comprises a drive motor for rotatably driving a shaft having first and second drive portions of different diameters. A rotatable puck is interposed between the drive portions and the turntable for drivingly coupling and uncoupling them. A pivotally movable control lever is movable by a handle in succession in a forward direction from an off position to a 33⅓ open position or a 45 rpm position, and then in the reverse direction back to the off position. Linkage means couple the control lever to the puck whereby movement of the lever between the off, 33⅓ rpm and 45 rpm positions selectively moves the puck (1) out of engagement with the drive portions and turntable, (2) into engagement with the first drive portion and turntable and (3) into engagement with the second drive portion and turntable respectively.

In another aspect of the invention, the drive shaft and first drive portion have the same diameter, and a sleeve such as a helical spring of larger diameter is tightly mounted on the drive shaft to form the second drive portion.

In still another aspect of the invention, the control lever has a side cam surface. The linkage means comprises a pivotally mounted plate having a cam follower pin riding on the side cam surface. The linkage age means further has an arm pivotally connected at one end to the plate, the puck being rotatably mounted on the opposite end of the arm. Resilient means are provided coupled to the arm for urging the puck toward the drive shaft and turntable, and for pivoting the plate urging the cam follower pin toward the side cam surface.

In a more specific aspect of the invention, the control lever has a slot, and the plate is pivotal about a rigid post extending through the slot.

In a still more specific aspect of the invention,, the first and second drive portions are coaxial and lie in spaced apart horizontal planes. The control lever comprises a three legged substantially Y-shaped member pivotal about the end of one leg, having a handle on the end of another leg, and having an upper cam surface on the third leg for engaging a cam follower on the plate for moving the puck and linkage means between the horizontal planes. The third leg further has a bottom cam surface coacting with the drive motor switch for switching the drive motor off when the lever is in its off position, and for switching the motor on when the lever is in the 33⅓ rpm and 45 rpm positions.

The aforementioned aspects of this invention solve the problems presented heretofore by prior art drive control mechanisms for phonographs. This is achieved by an improved combination of structural elements of a drive control mechanism that in an off position retract a rotatable puck from drive portions of the drive shaft and turntable, and inactivate the drive motor, and in the 33⅓ rpm and 45 rpm positions selectively cause the puck to drivingly couple the drive portions to the turntable, and to turn the drive motor on. The primary advantage of this invention is to eliminate the formation of a flattened portion on the puck which would interfere with the accuracy and constancy of the rotational velocity of the puck and turntable.

The invention and its advantages will become more apparent from the detailed description of the invention presented below.

BRIEF DESCRIPTION OF THE DRAWINGS

The details of this invention will be described in connection with the accompanying drawings, in which.

DETAILED DESCRIPTION OF THE INVENTION

Figure 1:
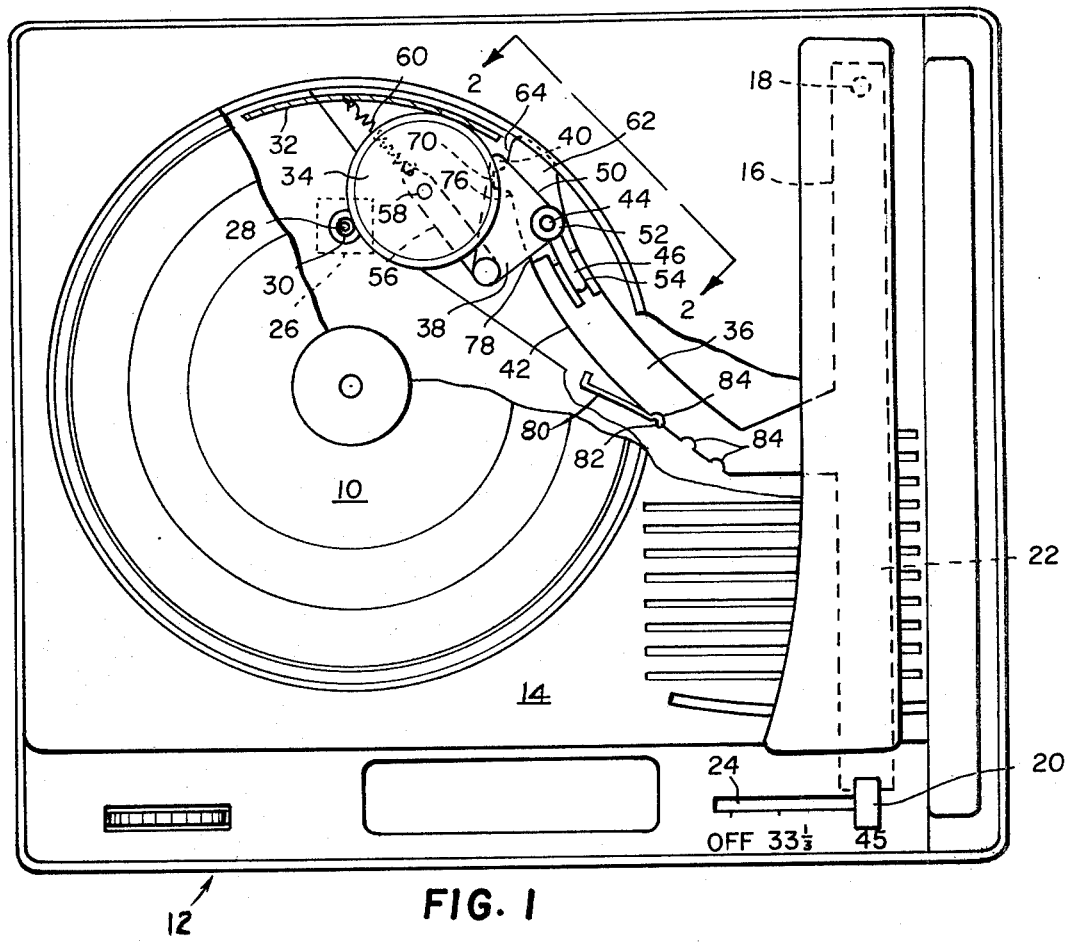
FIG. 1 is a top plan view with portions thereof broken away of a phonograph in which is incorporated a preferred embodiment of a turntable drive control mechanism of the invention shown in its 45 rpm position.

Referring to FIG. 1, a drive control mechanism for a turntable 10 of a phonograph 12 is constructed in accordance with a preferred embodiment of the invention. The drive control mechanism is mounted on a platform 14 of the phonograph which also rotatably supports turntable 10. The drive control mechanism comprises a substantially three legged Y-shaped control lever 16.

The control lever is mounted on the under-surface of the platform for pivotal movement in a horizontal plane about a vertical spindle 18 on platform 14 extending through an opening in the end of one leg. The lever 16 is pivotally moved by a handle 20 on the end of another leg 22 along a slotted scale 24 on platform 14 between off, 33⅓ rpm and 45 rpm positions located in succession.

A drive means for turntable 10 comprises a drive motor 26 shown dotted in FIG. 1 mounted on the undersurface of platform 14 and having a vertically extending drive shaft. The drive shaft has an upper drive portion 28 of the same diameter as the drive shaft, and a lower drive portion 30 of larger diameter than the drive shaft. The lower drive portion 30 is achieved by tightly encircling a helical spring on the drive shaft.

A driven means for selectively coupling the upper and lower drive portions 28, 30 respectively to an annular rim 32 depending from the turntable 10 comprises a rotatable puck 34 which is movable between upper and lower horizontal planes. The outer periphery of the puck while in the upper plane is selectively pressed into frictional engagement with upper drive portion 28 and turntable rim 32 for driving turntable 10 at a rotational speed of 33⅓ rpm. The outer periphery of puck 34 while in the lower plane is pressed into frictional engagement with lower drive portion 30 and rim 32 for driving turntable 10 at a rotational speed of 45 rpm.

The mechanism for selectively controlling movement of puck 34 between the upper and lower horizontal planes and into and out of engagement with drive portions 28, 30 and turntable rim 32 comprises a leg 36 of control lever 16, and a linkage means for coupling the leg to puck 34. The linkage means comprises a triangular shaped plate 38 having a cam follower pin 40 depending from one corner thereof for engaging a side cam surface 42 on the side of leg 36. Another corner of plate 38 is pivotally and slidably mounted on a rigid vertical post 44 extending upwardly from platform 14 through an elongated slot 46 in leg 36. A spring 48 interposed between the upper surface of plate corner 50 and a cap 52 on post 44 biases a lower cam follower surface 53 on plate corner 50 into engagement with an upper cam surface 54 on the top of leg 36. An arm 56 has one end pivotally connected to a corner of plate 38, and further has a vertical stud on its other end upon which puck 34 is rotatably mounted. Resilient means such as a helical spring 60 has one end connected to arm 56, and its opposite end connected to platform 14 for constantly urging plate 38 in a clockwise direction forcing cam follower pin 40 toward side cam surface 42. Pivotal movement of plate 38 in clockwise and counter-clockwise directions imparts reciprocal movement to arm 56 for moving puck 34 into and out of engagement respectively with drive portions 28, 30 and turntable rim 32.

Figure 2:
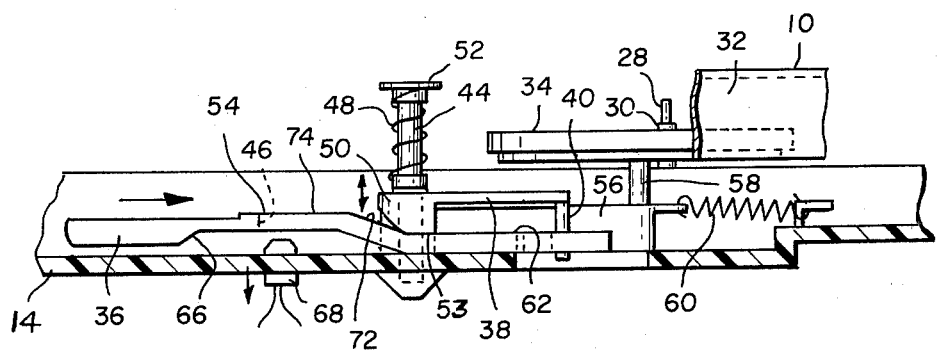
FIG. 2 is an enlarged side elevational view partly in section taken substantially from line 2—2 of FIG. 1.
Figure 3:
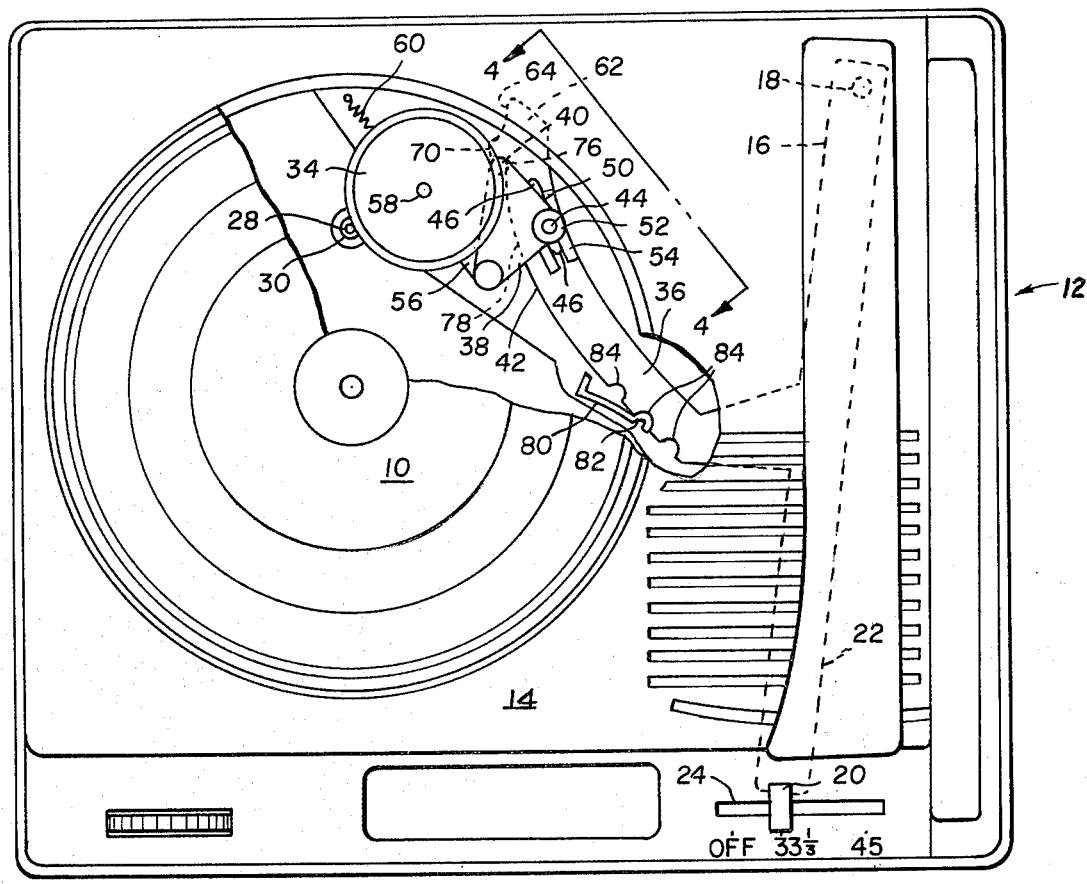
FIG. 3 is a view similar to FIG. 1 showing the turntable drive control mechanism in the 33⅓ rpm position.

Placement of control lever 16 in the 45 rpm position as seen in FIGS. 1 and 2 causes cam follower 53 on plate corner 50 to rest on a lever flat portion 62 of upper cam surface 54. This positions plate 38, arm 56 and puck 34 in a horizontal plane in alignment with lower drive portion 30. In this position, spring 60 pivots plate 38 in a clockwise direction, as cam follower pin 40 follows cam surface portion 64, forcing puck 34 into frictional engagement with lower drive portion 30 and turntable rim 32. A cam surface 66 on the lower side of leg 36 (FIG. 2) is retracted from drive motor switch arm 68 causing it to assume its normal closed position. This connects a power supply, not shown, to drive motor 26 causing it to operate for driving turntable 10 at 45 rpm.

When control lever 16 is moved from the 45 rpm position to the 33⅓ rpm position or vice versa, a side cam lug portion 70 initially pivots plate 38 in a counter-clockwise direction withdrawing puck 34 from engagement with lower or upper drive portions 30, 28 respectively and turntable rim 32. While puck 34 is disengaged, a curved portion 72 of upper cam surface 54 raises or lowers plate 38 to upper or lower flat portion 74, 62 respectively to selectively position puck 34 in horizontal planes in alignment with upper or lower drive portions 28, 30 respectively. As lever 16 reaches the 33⅓ rpm or 45 rpm positions, cam surface portions 76, 64 respectively allow pin 40 and plate 38 to pivot in a clockwise direction causing puck 34 to frictionally engage upper or lower drive portions 28, 30 respectively and turntable rim 32. Also, in either 33⅓ or 45 rpm position, lower cam surface 66 is disengaged from drive motor switch 68 which assumes its normally closed position. This causes drive motor 26 to operate for driving turntable 10 at 33⅓ or 45 rpm.

Figure 4:
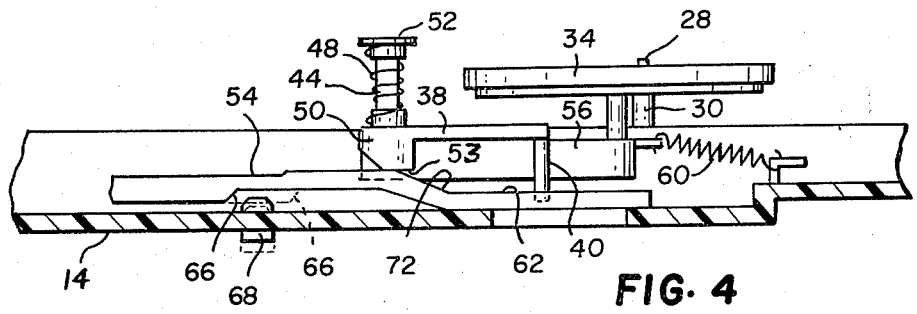
FIG. 4 is an enlarged side elevational view partly in section taken substantially along line 4—4 of FIG. 3.
Figure 5:
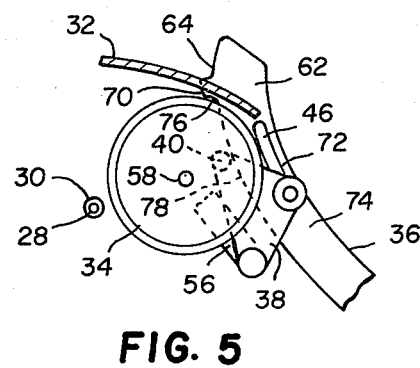
FIG. 5 is a segmental top plan view of a portion of the turntable drive control mechanism shown in its off position.

With reference to FIGS. 4 and 5, when control lever 16 is in its off position, plate 38 rests on flat portion 74 of upper cam surface 54 positioning puck 34 in a horizontal plane in alignment with upper drive portion 28. In this off position, follower pin 40 engages side cam surface portion 78 of side cam surface 42 which pivots plate 38 in a counter-clockwise direction withdrawing puck 34 from upper drive portion 28 and turntable rim 32 and holding it in the withdrawn position. Also, in this off position, lower cam surface 66, as seen dotted in FIG. 4, engages and depresses drive motor switch 68 turning off drive motor 26.

Any suitable detent may be provided for releasbly holding control lever 16 in each of the off, 33⅓ rpm and 45 rpm positions. The detent is shown as a leaf spring 80 having one end fixed to platform 14, and a lug 82 on its free end normally biased against the side of leg 22 into suitable recesses 84 therein.

The invention has been described in detail with particular reference to preferred embodiments, but it will be understood that variations and modifications can be effected within the spirit and scope of the invention.

What is claimed is:

1. An improved drive control mechanism for a turntable of a phonograph having an off position, a 33⅓ rpm drive position, and a 45 rpm drive position comprising:
   a drive motor;
   a drive shaft driven by said drive motor and having first and second vertically spaced drive portions of different diameters;
   a rotatable puck interposed between said drive portions and said turntable for selectively drivingly connecting and disconnecting said drive portions to said turntable;
   a fixed platform;
   a control lever slidably movable on said platform and having a first cam surface on one side thereof, a second cam surface on the upper surface thereof, and an elongated slot extending through said lever and said second cam surface, said control lever having a handle for moving said control lever between said off, 33⅓ rpm and 45 rpm positions;
   an upwardly extending post secured to said platform and extending through said slot, said post having a shoulder;

a plate having first, second and third spaced apart portions with said first portion thereof pivotally mounted on said post, said first portion further being interposed between said upper surface and said shoulder;

an arm having one end rotatably supporting said puck, and its opposite end pivotally connected to said second portion of said plate;

a cam follower pin depending from said third portion of said plate for engagement with said first cam surface for moving said puck into and out of engagement with said first and second drive portions upon movement of said control lever between said off, 33⅓ rpm and 45 rpm positions;

a cam follower surface on said first plate portion slidably engaging said upper surface of said lever and said second cam surface for raising and lowering said plate and said puck into and out of vertical alignment with said first and second drive portions in timed relation with said in and out movement of said puck upon movement of said lever between said 33⅓ rpm and 45 rpm positions;

a first spring interposed between said post shoulder and said first plate portion for urging said cam follower surface into engagement with said upper surface of said lever; and a second spring for biasing said puck toward said drive portions and said turntable for drivingly connecting said drive portions to said turntable, and for urging said cam follower pin into engagement with said first cam surface.

2. A drive control mechanism according to claim 1 wherein said plate is triangular, and said first, second and third plate portions are first, second, and third corners respectively of said triangular plate.

3. A drive control mechanism according to claim 1 wherein said control lever has a third cam surface on the lower surface thereof for switching said motor off when said lever is in its off position, and for switching said motor on when said lever is in said 33⅓ rpm and 45 rpm positions.

* * * * *